3,423,267
METHOD FOR MANUFACTURING CHIPBOARD PLATES AND THE LIKE
Edmund Munk, Oberstenfeld, Wurttemberg, Germany, assignor to Furnier- und Sperrholzwerk J. F. Werz Jr., KG., Oberstenfeld, Wurttemberg, Germany
Continuation of application Ser. No. 278,249, May 6, 1963. This application Nov. 15, 1967, Ser. No. 683,413
U.S. Cl. 156—214         3 Claims
Int. Cl. B29j 5/02

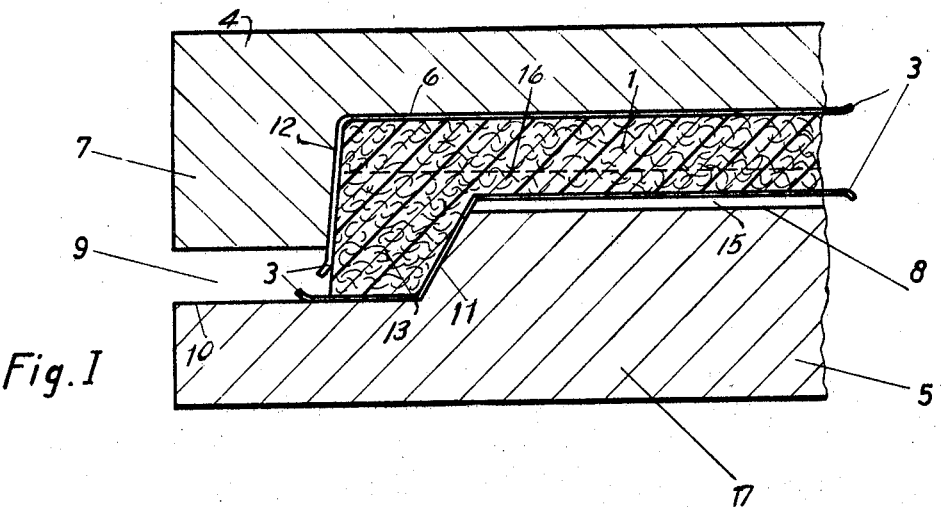
Fig. I
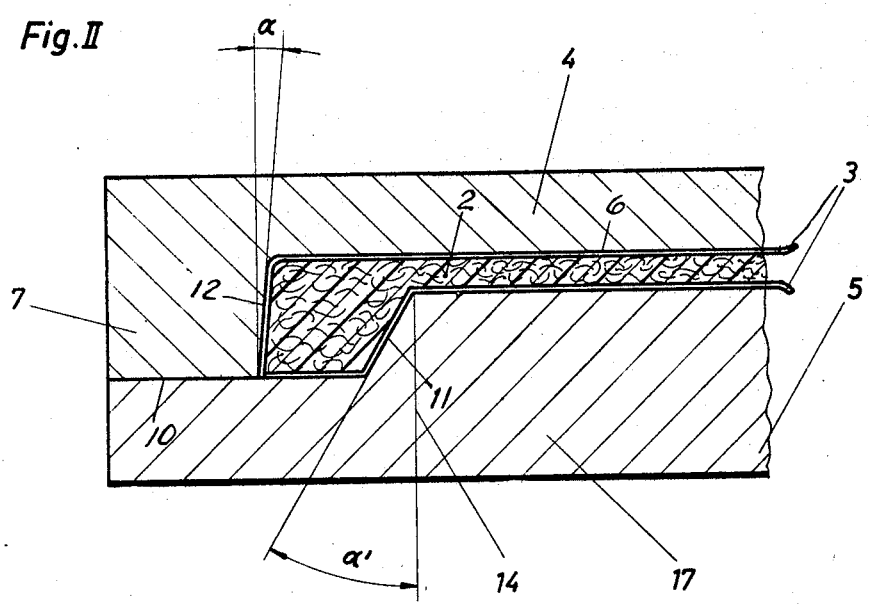
Fig. II
Edmund Munk
INVENTOR.
BY Dicke + Craig
ATTORNEYS

United States Patent Office 3,423,267
Patented Jan. 21, 1969

ABSTRACT OF THE DISCLOSURE

A method of molding under heat and pressure a plate-shaped object of a mixture of comminuted wood and a thermosetting resin, the object having smooth-edged surfaces extending at nearly right angles to the longitudinal plane of the plate. In order for the outer edge portion of the plate to have a solidity and compressive strength at least equal to that of the other parts of the plate, it is necessary that a back pressure at an inclined lateral direction be exerted during molding upon the inner surface of the edge portion of the blank and upon the laterally extending, nearly right angle edge portion. Achieving uniform compressive strength and solidity is especially necessary where the molded plate is to be coated with "sheet plastic" or other coating material.

CROSS-REFERENCES TO RELATED APPLICATIONS

This application is a continuation of application Ser. No. 278,249, filed May 6, 1963, and now abandoned.

BACKGROUND OF THE INVENTION

The present invention relates to a method for manufacturing molded chipboard plates and similar products which are made of a mixture of fibrous materials, especially wood chips, and of thermosetting binders, especially synthetic resins, and it is an object of the invention to provide such plates with smooth edge surfaces extending at nearly right angles to the longitudinal plane of the plate and with outer edge portions adjacent to these surfaces which have a solidity and compressive strength at least equal to that of the other parts of the plate. A further object of the invention is to provide a method of coating such plates or the like with sheets of a thermosetting plastic or plastic-impregnated material (hereafter referred to collectively as "sheet plastic"), wherein the plates themselves are being molded under heat and pressure to their final shape and dimensions and in a manner so that the sheet plastic will be integrally and uniformly combined not only with the main surfaces but just as firmly with the edge surfaces of the plate.

While in the past it has been easily possible by means of simple and inexpensive male and female dies to mold the plane or slightly uneven main longitudinal surfaces of resin-impregnated chipboard plates so as to have a uniform solidity and also a sufficient compressive strength to insure that, when such plates were coated with sheet plastic, such sheets were integrally combined with these main surfaces, it was, however, impossible by means of such simple tools also to provide such plates with edge portions of at least the same solidity and compressive strength as those of the main parts of the plates and also with smoothly molded edge surfaces, especially if they had to be inclined at an angle of nearly 90° to the longitudinal plane of the plate. This difficulty is due to the fact that, during the curing of the synthetic resin in the plate under heat and vertical pressure, a shrinkage of the material occurs in all directions. While the shrinking surfaces can be followed along the opposite main sides of the plate by means of simple opposite dies or pressure plates, it required in the past very expensive tools which were able to follow this shrinkage also along the lateral edge surfaces and to apply thereon the necessary pressure so as to mold these edge surfaces so as to be as smooth as the main surfaces of the plate and to have a compressive strength at least as great as that of the main parts of the plate. Whereas in the manufacture of uncoated plate-shaped chipboard products by means of ample male and female dies this difficulty may be overcome by cutting off or smoothing the rough and insufficiently compressed edges by a separate operation, this is obviously impossible if in the course of the final molding of the chipboard to its desired shape and dimensions, it is also to be coated with one or more sheets of plastic or plastic-impregnated material which should be combined with the chipboard so as to be integral therewith at all points. When the material of the molded chipboard shrinks during the curing process, it recedes from the lateral walls of one die and thus also from the edge surfaces of the sheet plastic thereon. This shrinkage may be so strong that instead of being integrally combined with the body of the chipboard and of having a solidity and compressive strength equal to the main parts of the coated chipboard, the lateral edge portions of the plastic coating will be separated by gaps from the chipboard body. This disadvantage is further aggravated by the fact that a chipboard plate with relatively sharp edges which is made of flat chips, which are especially desirable for the production of molded parts since they result in products of a greater solidity and bending strength, has a much higher compressive strength in the direction vertical to this plane than in the direction parallel thereto. Consequently, the compressive strength of such a chipboard plate in the direction parallel to the plane of the plate is generally considerably lower than that which is required for integrally combining the edge portions of the plastic sheet with those of the chipboard. It is therefore evident that additional means are required to overcome these disadvantages. As stated above, this was previously possible only by employing very expensive tools which permitted the application of an additional lateral pressure from the outside upon the edge portions of the coated chipboard, especially during the curing process thereof.

It is a further object of the present invention to overcome the above-mentioned difficulties and disadvantages in a very simple manner, without requiring any complicated and expensive molding tools, and by merely employing a mold which only consists of simple male and female dies.

SUMMARY OF THE INVENTION

According to the invention, the aforementioned objects may be attained by providing one of the dies of the mold with a projection which has at least one inclined side which is laterally spaced from and inclined at a larger angle than the surface of the other die which is inclined at an angle of nearly 90° to the longitudinal plane of the mold and of the chipboard plate to be formed therein. When the mold is being closed and the chipboard plate is heated and compressed to its final dimensions and is simultaneously cured, a back pressure is exerted by this projection from the inside of the edge portion of the plate in the inclined direction toward the outer edge surface thereof and the relatively sharp corner between this edge surface and the main upper or lower surface of the plate. This inclined surface of the projection on one die of the mold therefore serves as an abutment which not only prevents the edge portion of the plate from receding from the lateral surface of the die when the material is being cured but, due to the wedging back pressure which it exerts upon the edge portion, it compensates for any shrinkage of the outer surface thereof so that the solidity and compressive strength of this edge portion will be at least as great as that of the other parts of the plate. If the plate while being molded is to be simultaneously coated with sheet plastic or plastic-impregnated material, there is also no possibility that gaps can form between the body of the molded plate and the edge portions of the sheet plastic, but these edge portions will be firmly pressed against, integrally combined with, and cured together with the plate.

The strength of the lateral molding pressure upon the outside of the edge portion and the strengths of the wedging back pressure upon the inner side of the same portion, as well as the direction in which these pressures are exerted may be varied by changing the inclination of the abutment surface on one die or of the inner edge surface of the other die or of both surfaces relative to each other.

Especially if the chipboard is also to be coated with sheet plastic, the new method is carried out in two separate operations. In the first operation, the mixture of chips and synthetic resin is compressed so as to form a blank of the greater thickness than that of the final product but of substantially the same length and width as the latter. This may be carried out either in a cold mold or in one which is only slightly heated so that the synthetic resin will not be cured. Thereafter, the sheet plastic which is to be secured upon the entire chipboard or upon certain parts thereof is placed into the heated final mold or applied upon the premolded blank and inserted with the latter into this mold. The mold is then closed and held closed in the usual manner until the molded chipboard and the sheet plastic thereon are completely cured and set and integrally combined with each other at all points.

The method according to the invention may also be carried out by first completely compressing and partly curing the blank alone in the manner as previously described, by then reopening the heated mold and applying the sheet plastic upon the parts of the blank to be coated, and by then again closing the mold so as to press the sheet plastic upon the blank, to combine it integrally therewith, and to cure the sheet plastic and complete the curing of the blank.

BRIEF DESCRIPTION OF THE DRAWING

The method according to the invention and the features of the mold for carrying out this method will become more clearly apparent from the following description which is to be read with reference to the accompanying diagrammatic drawings, in which:

FIGURE 1 shows a cross section of the heated mold at the beginning of its closing movement upon a preformed blank which is covered with one or more sheets of plastic; while FIGURE 2 shows the heated mold according to FIGURE 1 in the fully closed position.

DETAILED DESCRIPTION OF THE INVENTION

Although the new molding method may also be employed for producing an uncoated chipboard plate, the invention will hereafter be described with regard to its application for producing a molded chipboard plate which is coated with sheet plastic or plastic-impregnated material. Such a combined molding and coating method requires two separate stages or operations, namely, first the compression of a mixture of wood chips or similar materials with a thermosetting synthetic resin in a cold or only slightly heated mold so as to form a blank 1 as shown in FIGURE 1 of a shape and size similar to those of the uncoated, final chipboard plate 2 as shown in FIGURE 2, but thicker than the latter, and second, the molding of the blank 1 under pressure in the heated mold according to the invention in order to compress the blank to the final dimensions of the chipboard plate, to secure the coating 3 of sheet plastic on the outer surfaces of this plate, and to cure the chipboard plate and the plastic coating so as to be integrally combined with each other at all points.

In the drawings, only this second stage of the new method is illustrated since the first stage of forming the premolded blank 1 is conventional. The mold consists of an upper die 4 and a lower die 5. As indicated in solid lines in FIGURES 1 and 2, the upper die 4 is provided with an inner substantially horizontal surface 6 and a lateral downward projection 7. The lower die 5 has a substantially horizontal main upper surface 8, a lateral recess 9 with an upper surface 10, and an inclined wall 11 connecting the two surfaces 8 and 10. The projection 7 has such a height and the recess 9 such a depth that, when the lower surface of the projection engages with the upper surface of the recess, the main surfaces 6 and 8 of the two dies are spaced from each other at a distance in accordance with the final desired thickness of the main body of the coated chipboard plate 2. The inner surface 12 of the projection 7 extends at almost a right angle to the longitudinal planes of the inner surface 6 of the upper die 4 and the main upper surface 8 of the lower die 5, exceeding such a right angle only by the small angle $\alpha$, as indicated in FIGURE 2, while the inclined wall 11 of the lower die 2 is spaced at a sufficient distance from the inner surface 12 of the projection 7 of the upper die 4 so that a relatively thick reinforcing projection 13 will be formed on the final coated chipboard plate 2, as shown in FIGURE 2. The angle $\alpha'$ of wall 11 to the perpendicular 14 may be made of any desired size and depends upon the desired compressive strength of the edge portion including the projection 13 and also upon the size of the angle $\alpha$ of the outer surface of this projection.

The molding and coating method according to the invention may be carried out in such a manner that, when the mold is in the fully opened position, the premolded blank 1 is inserted into the lower die 5 together with the sheet plastic 3 or plastic-impregnated material, such as paper, veneers, or the like, which may be either applied upon the respective surfaces of one or both dies or upon those of the blank 1. When blank 1 is inserted into the lower die 5, the lower surface of the projection 13 of the blank rests on the upper surface 10 of recess 9 of this die and a small gap 15 then remains between the lower surface of the main part of the blank and the upper surface 10 of the lower die 5. The upper die 4 of the heated mold is then moved toward the lower die 5 until the mold is completely closed, that is, when the lower surface of the projection 7 of the upper die 4 engages with the upper surface 10 of the recess 9 of the lower die 5 and the inner surface 6 of the upper die 4 is located in the position as shown in FIGURE 2. Blank 1 with the sheet plastic 3 thereon is then not only compressed in the perpendicular direction to the extent as may be seen by a comparison between FIGURES 1 and 2, but the left edge portion and the projection 13 on blank 1 are additionally compressed to a minor extent in a direction slightly inclined to the perpendicular by the slightly inclined inner surface 12 of the upper die 4 and to a greater extent in the opposite direction by the inclined wall 11 of the lower die 5. The compressive strength of this edge portion and projection therefore depends not only upon the perpendicular pressure, but also upon the lateral pressures which are of a size in accordance with the sum of the angles $\alpha$ and $\alpha'$.

Instead of coating the blank 1 simultaneously with its compression in the manner as last described, it is also possible first only to insert the blank alone into the heated mold and to close the mold so as to compress the blank completely to its desired thickness and compressive strength, to provide the outer sides of the entire blank and especially those of the edge portion and projection 13 with smooth surfaces, and to begin the curing of the synthetic resin in the blank. The mold is then reopened and the sheet plastic 3 is quickly applied upon the surfaces of the blank which are to be coated. If the lower surfaces of the blank are also to be coated, it is of course necessary to remove the hot blank for a short time from the mold in order to apply the sheet plastic thereon or to place the latter into the mold and then to reinsert the blank into the mold. Thereafter, the mold is again closed so as to press the sheet plastic 3 against the smooth surfaces of the fully compressed blank and to heat the sheet plastic together with the blank so as to fuse the plastic to the blank and to cure the plastic and complete the curing of the blank. The coated blank is then left in the closed mold until it is sufficiently hardened.

Although the invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. A method of producing a molded, substantially plate-shaped object having smooth edge surfaces extending at nearly right angles to the longitudinal plane of the object with the outer edge portion adjacent to the surfaces having a solidity and compressive strength at least equal to that of the other parts thereof, comprising the steps of: forming a blank of a mixture of fibrous material and a thermosetting synthetic resin in a mold substantially without heating said mixture to form a substantially plate-shaped blank having a recess in one side forming the outer edges thereof at substantially right angles; inserting said blank into an open heated mold consisting of two parts defining a mold chamber having a shape similar to said blank; closing said heated mold and thereby compressing said blank to the final desired thickness of the molded object; simultaneously with closing of the heated mold exerting a back pressure at an inclined lateral direction upon the inner surface of the edge portion of the blank upon the laterally extending nearly right angle edge portion thereof to provide said edge portion with a compressive strength at least as great as that of the other parts of the fully compressed blank; partly curing said blank simultaneously with the closing of said heated molds; and maintaining said mold in said closed position until said blank is completely cured and sufficiently hardened.

2. The method as set forth in claim 1 wherein said blank is at least partially covered with sheet plastic.

3. The method in accordance with claim 1 with the additional steps of: removing said blank from said heated mold after the same is partially cured; covering at least a portion thereof with curable sheet plastic; and reinserting the same into said heated mold to fully cure the sheet plastic and blank.

References Cited

UNITED STATES PATENTS

| 1,910,525 | 5/1933 | Dempsey | 18—34 |
| 2,682,083 | 6/1954 | Patton | 264—119 |
| 3,146,285 | 8/1964 | Munk | 264—266 |
| 3,184,527 | 5/1965 | Fischer | 264—255 |

FOREIGN PATENTS 539,299    9/1941    Great Britain.

ROBERT F. WHITE, *Primary Examiner.*

T. J. CARVIS, *Assistant Examiner.*

U.S. Cl. X.R.

156—228; 264—112, 120, 266